C. J. BAKER.
DIRECTION INDICATING SIGNAL FOR AUTOMOBILES.
APPLICATION FILED NOV. 16, 1916.
1,250,763.
Patented Dec. 18, 1917.
2 SHEETS—SHEET 1.
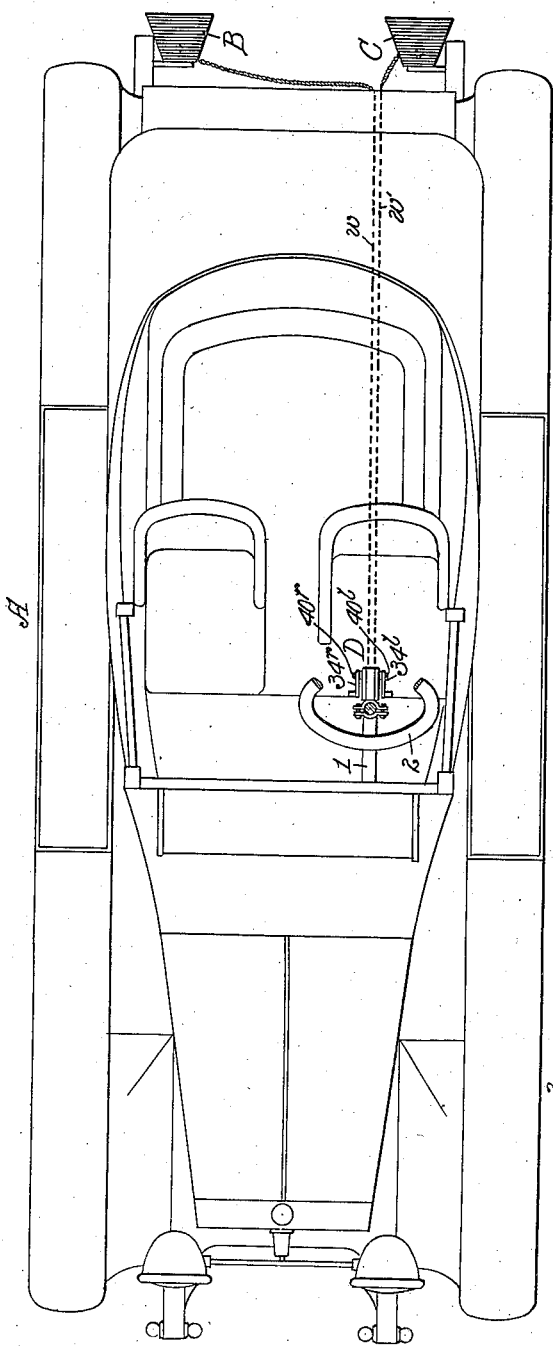
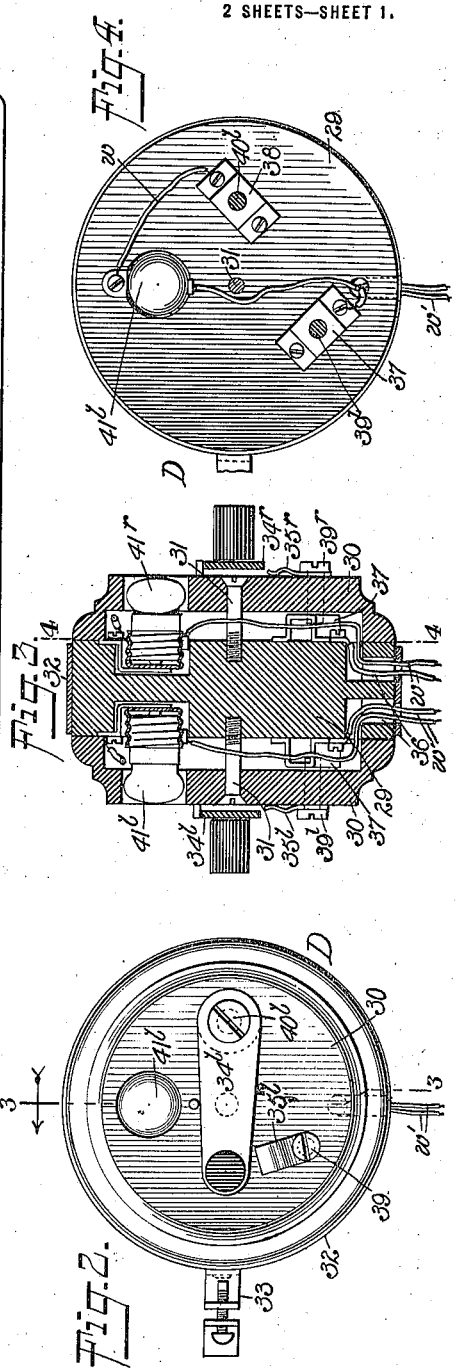

C. J. BAKER.
DIRECTION INDICATING SIGNAL FOR AUTOMOBILES.
APPLICATION FILED NOV. 16, 1916.
1,250,763.
Patented Dec. 18, 1917.
2 SHEETS—SHEET 2.
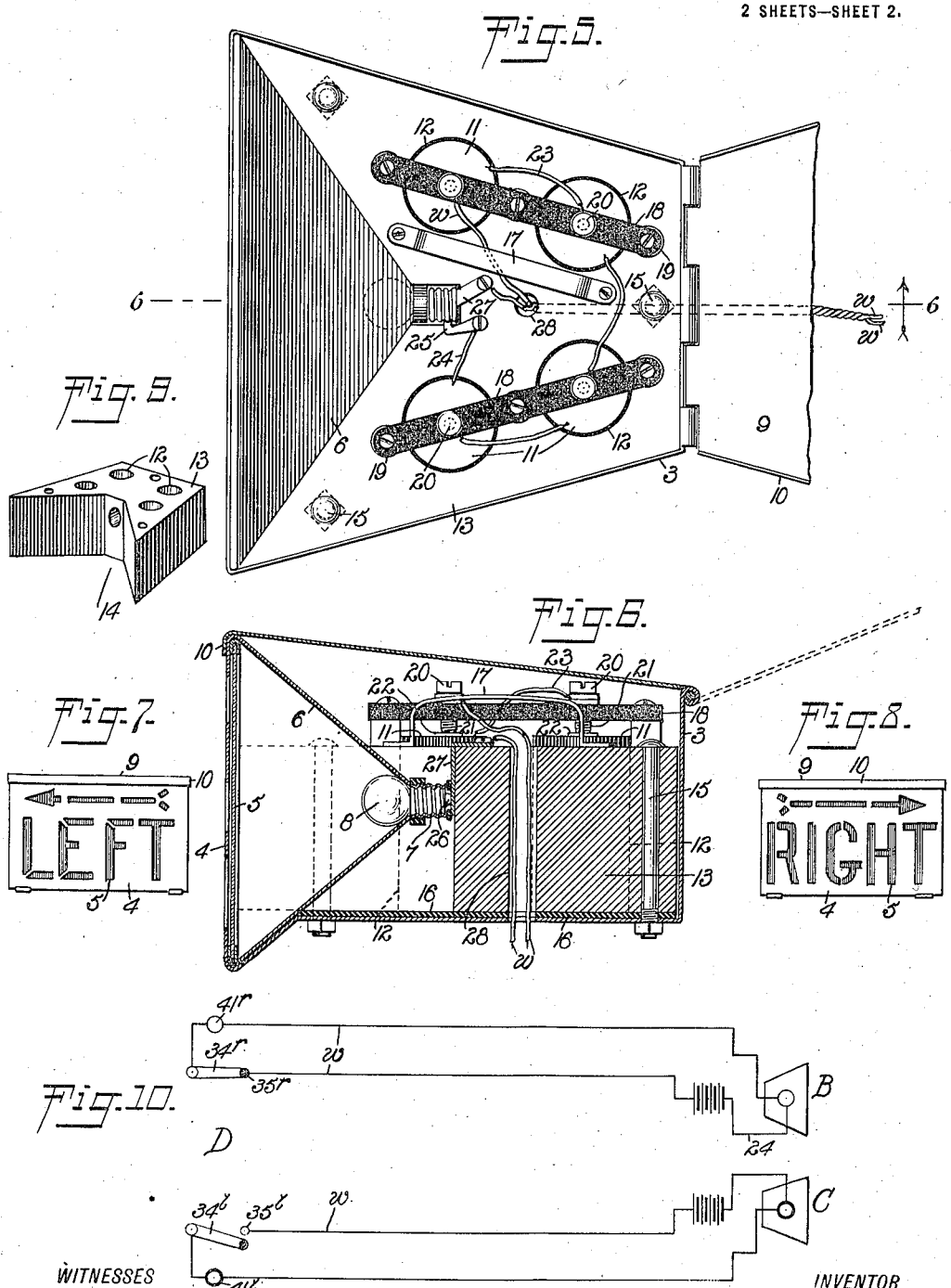

UNITED STATES PATENT OFFICE.

CHARLES J. BAKER, OF ELKHART, INDIANA.

DIRECTION-INDICATING SIGNAL FOR AUTOMOBILES.

1,250,763.  Specification of Letters Patent.  Patented Dec. 18, 1917.

Application filed November 16, 1916. Serial No. 131,677.

*To all whom it may concern:*

Be it known that I, CHARLES J. BAKER, a citizen of the United States, and a resident of Elkhart, in the county of Elkhart and State of Indiana, have invented a new and Improved Direction-Indicating Signal for Automobiles, of which the following is a full, clear, and exact description.

This invention relates to an indicating system adapted for automobiles and other vehicles for indicating the direction in which the vehicle is to be turned to thereby protect pedestrians, vehicles and persons occupying them, as well as for facilitating traffic.

The invention has for its general objects to provide a reliable and efficient signaling device which is of comparatively simple and inexpensive construction, capable of being readily installed on any type of vehicle, and so designed that the operation of switches on the steering post or adjacent thereto will independently light lamps which have certain legends, such as the words "Right" and "Left," for indicating the direction in which the car is to be turned.

A more specific object of the invention is the provision of a novel form of lamp box adapted to be mounted on the rear of the car at the right or left side thereof to indicate the direction in which the car is to be steered.

A further object of the invention is the provision of a novel form of duplex switch for controlling the circuits of the lamp boxes, the switch including tell-tale lamps for indicating the condition of the electric circuits of the system.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a plan view of an automobile with the direction indicating system applied thereto;

Fig. 2 is a side view of the combined switch and telltale device;

Fig. 3, is a sectional view on the line 3—3, Fig. 2;

Fig. 4 is a sectional view on the line 4—4, Fig. 3;

Fig. 5 is a plan view of one of the lamp boxes with the lid open;

Fig. 6 is a vertical section on the line 6ª—6, Fig. 5;

Figs. 7 and 8 are rear views of the lamp boxes;

Fig. 9 is a perspective view drawn on a reduced scale of the battery cell holder in a lamp box; and Fig. 10 is a diagrammatic view of the circuit connections.

Referring to the drawing, A designates an automobile which has mounted on the rear thereof the two direction indicating devices B and C for indicating when the automobile is to be turned to the right or left, such devices being controlled by an electric switch D, which is fastened to the steering post 1 of the automobile, the steering wheel 2 of the post being broken away to more clearly indicate the position of the switch device. However, the switch device may be located at any other convenient point where it is readily accessible to the driver.

The direction indicating device B or C is constructed as shown in Figs. 5, 6 and 9. Each device comprises a combined lamp and battery box 3 of suitable shape with the rear open, and at the open rear is a plate 4 which has the word "Right" or "Left" cut therein like a stencil, as shown in Figs. 7 and 8, and also on the plate 4 may be cut an arrow to form a supplemental indicating means to show the direction in which the car is to be turned. At the inner face of the plate 4 is arranged a glass 5. Within the box is a reflector 6 which is provided with a centrally disposed socket 7 for receiving an incandescent lamp 8. The casing 3, which may have a hinged lid 9 with an overhanging water shedding rim 10, forms a battery container. The cells 11 of the battery are disposed in intermediate sockets 12 bored in a block of wood 13 or equivalent insulating material, said block being shaped as shown in Fig. 9, that is to say, it has a recess 14 to fit around the reflector, and it is so shaped as to fit the side and front walls of the casing 3. The block is held in place by bolts or other fasteners 15 which pass downwardly through the block and through the bottom of the casing. Under the block 13 is a strip of insulation 16 for preventing the battery cells from grounding on the metallic casing 3. To facilitate removal of the block and the cells a handle 17 is fastened to the top of the block. The cells are arranged in groups and over each group is a strip of insulation 18 fastened to the block 13 by screws 19. These strips overlie the cells and each strip has a binding post 20, the studs 21 of which bear against the central terminals 22 of the cells. The cells are connected together in series by wires 23 leading from the shell of one cell to the binding post 20 of the next cell. One terminal of the battery is connected by a wire 24 with a contact 25 with which the lamp socket 7 is engaged, and the central contact 26 of the lamp is adapted to bear against a contact 27 which is connected with a circuit wire which leads to the switch device D. The block 13 has a vertical passage 28 through which the leading-in wires extend for connection with the battery and lamp.

The controller D on the steering post is a combined switch and telltale device and is constructed as shown in Figs. 2 to 4 inclusive. This device comprises a central block of insulation 29 having removable plates 30 or outer sections at opposite sides, the sections of this insulating body being fastened together by screws 31, Fig. 3. Extending around the central section 29 of the body of the device D is a band 32 having a clip 33 for embracing the steering post. On opposite sides of the body of the device D are movable switch levers $34^r$ and $34^l$ adapted to engage respectively the contacts $35^r$ and $35^l$, whereby the circuits of the right and left direction indicating devices B and C can be opened or closed. The circuit wires $w$ and $w'$ for the direction indicating devices lead into openings 36 in the device D, and one side of each circuit connects with an anchor piece 37 and the other side connects with a telltale lamp which in turn connects with another anchor piece 38 arranged within the body of the device D. The anchor pieces 37 have threaded apertures into which the screws $39^r$ and $39^l$ engage, which screws respectively fasten the contacts $35^r$ and $35^l$ in place. The movable contacts are fastened by screws $40^r$ and $40^l$ which screw into anchor pieces 38. The telltale lamps $41^r$ and $41^l$ are set into sockets in the sides of the body A and are in circuit respectively with the contacts $34^r$, $35^r$ and $34^l$, $35^l$, or that when the right switch is closed, the lamp of the right indicating device B as well as the right telltale lamp $41^r$ will be lighted, and when the left switch is closed the lamp of the left direction indicating device C and left telltale lamp $41^l$ will be lighted. The telltale lamps enable the driver to immediately ascertain the condition of the electric circuit when the switches are closed, and if the telltale lamps do not light when the switch is closed, it indicates that the switch is not in proper condition.

The telltale lamps throw rays of light laterally so that any one coming toward the car can see the direction in which the car is to turn, and these lamps also light the side of the roadway during turning.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A direction indicator of the class described, comprising a casing, an illuminated signal element, a lamp in the casing for illuminating the element, a block of insulation fitted in the casing and having sockets, battery cells in the sockets, insulators fastened to the said block and disposed over the cells, binding posts on the insulators and engaging the central terminals of the cells, means for connecting the binding posts of one cell with the outer terminal of an adjacent cell, and means connecting the cells with the lamp.

2. A direction indicator of the class described comprising a casing, a reflector therein, a lamp in the reflector, an illuminated signal plate behind the reflector and lamp, a socketed body fitted in the casing, battery cells disposed in the sockets of the body, means on the body and including binding posts for engaging the cell terminals of one polarity, means for connecting the binding posts of one cell with the opposite terminal of an adjacent cell, and means for connecting the lamp in circuit with the cells.

3. A direction indicator comprising a combined lamp and battery box, said box including a block of insulation fitted therein and having vertical sockets, cells disposed in the sockets in groups, a strip of insulation fastened to the block and disposed over each group of cells, binding posts on the strips and contacting with the central terminals of the cells, means for connecting the binding posts and outer terminals of the cells in series relation, and a lamp in the box connected in circuit with the cells.

CHARLES J. BAKER.